United States Patent [19]

Yoshinaga et al.

[11] Patent Number: 4,733,281

[45] Date of Patent: Mar. 22, 1988

[54] TRANSPORT CONTROL DEVICE FOR AN IMAGE RECORDING APPARATUS

[75] Inventors: Kenji Yoshinaga; Kenji Takeda, both of Yokohama, Japan

[73] Assignee: Canon Kabushiki Kaisha, Tokyo, Japan

[21] Appl. No.: 832,652

[22] Filed: Feb. 25, 1986

[30] Foreign Application Priority Data

Feb. 28, 1985 [JP] Japan .................................. 60-37379
Jun. 20, 1985 [JP] Japan .................................. 60-133089

[51] Int. Cl.⁴ .................................................. F03G 15/00

[52] U.S. Cl. .................................. 355/14 R; 355/14 SH; 355/14 FU; 355/14 TR

[58] Field of Search .............. 355/14 SH, 14 R, 14 C, 355/14 TR, 14 FU, 4; 271/258, 259

[56] References Cited

U.S. PATENT DOCUMENTS

| | | | |
|---|---|---|---|
| 3,612,677 | 10/1971 | Langdon et al. | 355/4 |
| 4,072,412 | 2/1978 | Suda et al. | 355/4 Y |
| 4,231,567 | 11/1980 | Ziehm | 271/259 |
| 4,247,193 | 1/1981 | Kaneko et al. | 355/14 R |
| 4,497,569 | 2/1985 | Booth, Sr. | 355/14 R |
| 4,540,274 | 9/1985 | Abuyama | 355/14 CY |

*Primary Examiner*—A. T. Grimley
*Assistant Examiner*—J. Pendegrass
*Attorney, Agent, or Firm*—Fitzpatrick, Cella, Harper & Scinto

[57] ABSTRACT

A copying machine, or a similar image recording apparatus, does not terminate the image forming process, even when an abnormality in sheet transportation is detected, until the process is completed, and a sheet bearing the image prepared in this image forming process is transported after jammed sheets are removed, so that unnecessary waste of imaging sheets can be avoided.

11 Claims, 20 Drawing Figures

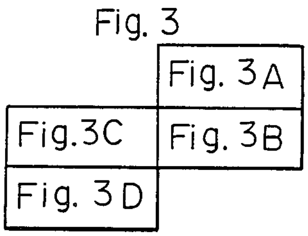
Fig. 3 A
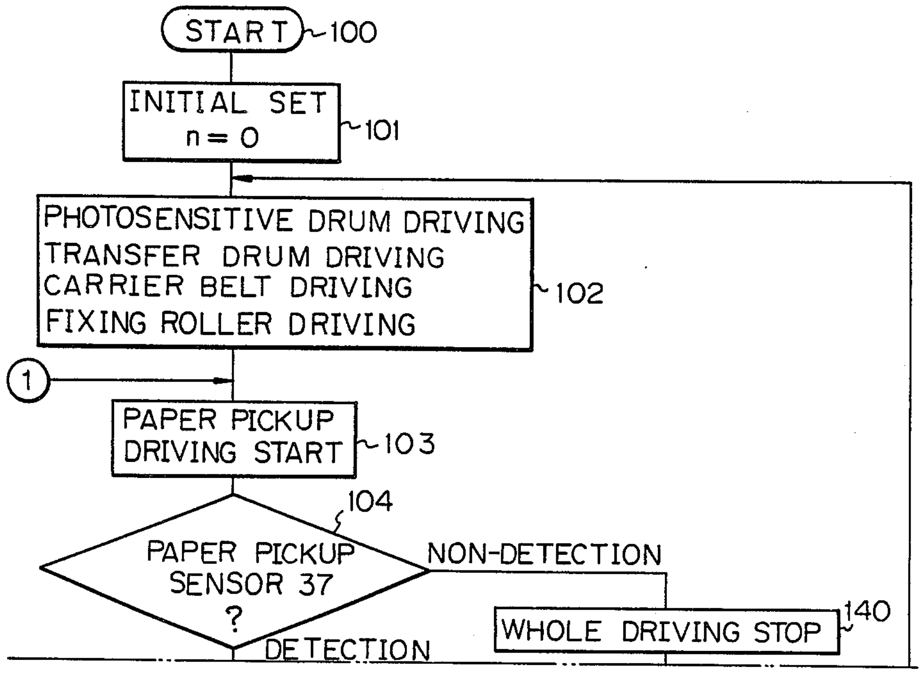

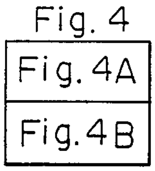
*Fig. 4A*
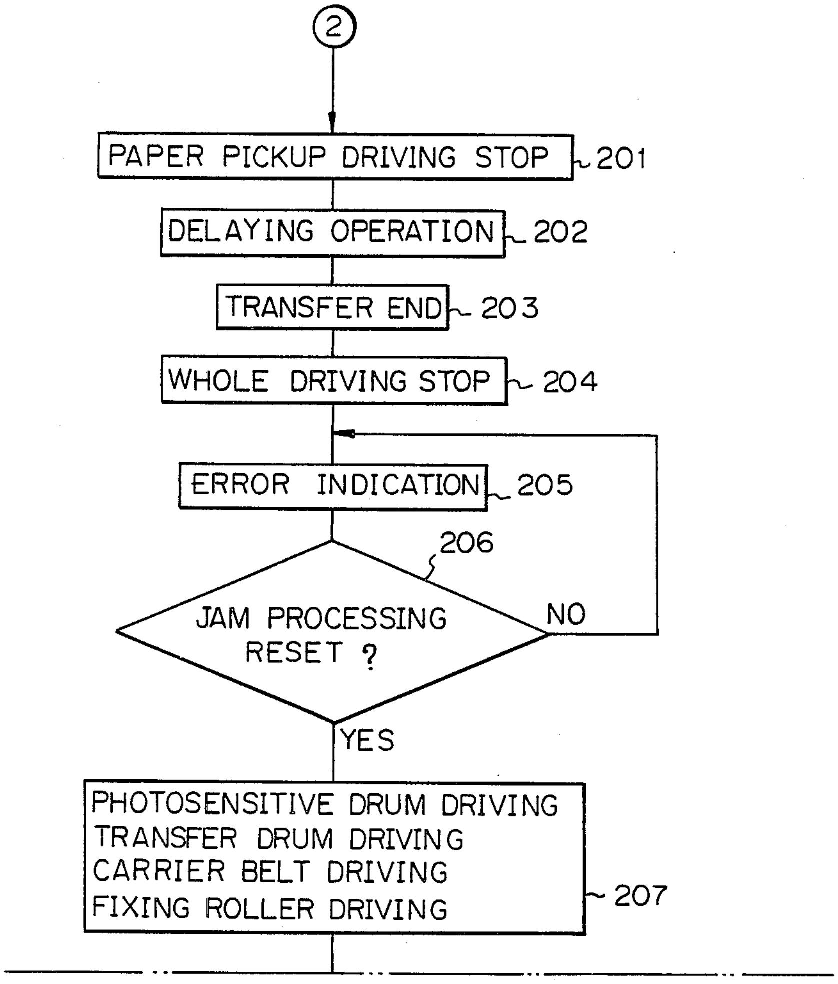

| Fig. 5A |
|---|
| Fig. 5B |

TRANSPORT CONTROL DEVICE FOR AN IMAGE RECORDING APPARATUS

BACKGROUND OF THE INVENTION

1. Field of the Invention

The present invention relates to an apparatus for recording an image on a sheet such as a recording paper.

2. Related Background Art

In continuous operation of a conventional image forming apparatus employing image forming sheets or ink sheets, a succeeding sheet is usually is fed into an image forming path after a preceding sheet is subjected to an image forming operation but before said preceding sheet is discharged from the apparatus or before said sheet reaches a stacking position in the apparatus, in order to reduce the time required for image forming process in such continuous operation. Consequently, in such continuous operation of the image forming apparatus, plural sheets are present in the transport path in the apparatus.

For example, in an electrophotographic color image forming apparatus in which toner images obtained by developing, with colored toners, electrostatic latent images formed on a photosensitive member are transferred, in registration, on a sheet material borne on a transfer drum, a succeeding sheet material may be already fed into the apparatus and placed on said transfer drum while a preceding sheet material is still in a fixing station which is the final stage of the image forming process.

Also in image forming apparatus in which an image is formed by thermal transfer or ink jet on an imaging sheet supported on a rotary cylindrical member, a succeeding sheet material may be fed into the apparatus and placed on said cylindrical member while a preceding sheet is still in a transport unit toward the exit of the apparatus after being detached from said cylindrical member.

Also in image forming apparatus in which a sheet material other than the final image bearing sheet, such as a thermal ink sheet or a photosensitive master sheet, is supported on a rotary member, a succeeding sheet material may be already fed into the apparatus and placed on said rotary member while a preceding sheet is still in a transport path toward a determined stacking position after being separated from said rotary member.

On the other hand, when a succeeding sheet is placed on the rotary member, a preceding sheet which has completed image formation may still be on a discharge path.

Consequently, such image forming apparatus is usually so constructed, in case of an abnormality such as sheet jamming in the transport path, as to display such abnormality and to immediately stop all the driven parts such as transport means and image recording means, thus urging the operator to effect an appropriate countermeasure.

However, in such image forming apparatus, in case of a trouble in the transportation of a sheet material in the transport path, the operator has to remove not only the sheet that has caused said trouble but also a sheet on the rotary member since such sheet is no longer usable. This fact results in following drawbacks:

(1) Cumbersome sheet removal:

The sheet removal is very cumbersome as plural sheets have to be removed, with confirmation of positions of said sheets:

(2) Waste of sheet to be removed from the rotary member:

The sheet in the course of image forming process on the rotary member has to be removed and wasted even in case of a trouble in a sheet in the transport path:

(3) Waste of ink, toner etc. caused by the removal of sheet in the image forming process on the rotary member:

Removal of the sheet in the course of image forming process on the rotary member leads to waste of ink or toner employed in image formation: and (4) Poor image obtained on the sheet on the rotary member if the image forming process is interrupted:

For example, if the transfer drum of an electrophotographic image forming apparatus is stopped in the course of an image forming process, uniform image formation cannot be expected due to uneven image transfer in an area corresponding to the change in rotating speed. Also in an image forming apparatus for forming an image by digital dots on a sheet material, a change in rotating speed as explained above results in a change in the dot pitch, thus causing unevenness in the obtained image.

SUMMARY OF THE INVENTION

In consideration of the foregoing, an object of the present invention is to provide an improved image recording apparatus.

Another object of the present invention is to provide an image recording apparatus capable of effectively utilizing the sheet materials without waste.

Still another object of the present invention is to provide an image recording apparatus capable of preventing unnecessary waste of sheet materials and other consumable materials.

Still another object of the present invention is to provide an image recording apparatus allowing easy removal of sheet materials in case of a trouble in the transportation thereof.

Still another object of the present invention is to provide an image recording apparatus capable of preventing contamination in the apparatus at the removal of sheet materials therefrom.

Still another object of the present invention is to provide an image recording apparatus capable of preventing unevenness in image in case of a trouble in the transportation of the sheet materials.

The foregoing and still other objects of the present invention will become fully apparent from the following description.

Still another object of the present invention is to provide an image forming apparatus capable of efficiently discharging sheet materials in time, without trouble in transportation thereof and without incomplete image fixation.

In accordance with the invention, control functions are provided to continue upstream image processing when a downstream abnormality is detected, thus avoiding an unnecessary waste of paper.

DETAILED DESCRIPTION OF THE PREFERRED EMBODIMENTS

Now the present invention will be clarified in detail by embodiments thereof shown in the attached drawings.

Figure 1:
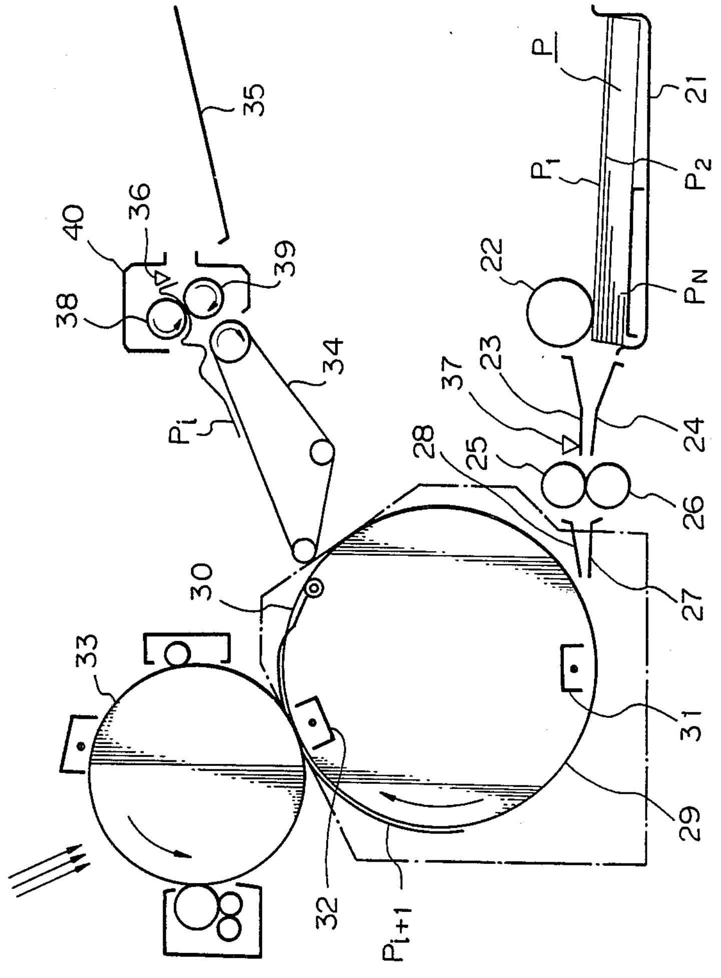
FIG. 1 is a schematic view of an electrophotographic color image recording apparatus.

FIG. 1 is a schematic view of an electrophotographic color image recording apparatus embodying the present invention.

Referring to FIG. 1, a sheet cassette 21 contains a stack of image transfer paper or sheets P.

A sheet feed roller 22, positioned above and at the downstream side in the transport direction of said cassette 21, is driven by an unrepresented clutch, and advances said sheets P one by one from the cassette 21 when rotated. Guide members 23, 24 are so positioned as to guide the transfer sheet P, extracted from the cassette 21, toward registration rollers 25, 26. A sheet feed sensor 37, for detecting the passing of the transfer sheet P is provided at a determined position of the guide members 23, 24.

The registration rollers 25, 26 control the transportation of the transfer sheet P fed from the sheet feed unit. The registration rollers 25, 26 are controlled by an unrepresented clutch mechanism and advance the transfer sheet P through guide members 27, 28 toward a support means comprising a transfer drum 29 at such timing that a gripper 30 on the rotating transfer drum 29 can grip said sheet P. Said gripper 30, provided on the external periphery of the transfer drum 29, is usually closed for example with a biasing spring and positioned approximately at the external periphery of said transfer drum 29, but is radially opened to the outside by an unrepresented gripper cam provided in the transfer drum 29, in case of gripping the transfer sheet Pi.

An attraction charger 31, provided in the transfer drum 29, causes electrostatic attraction of the transfer sheet P onto the transfer drum 29. A transfer charger 32 causes transfer of a toner image, formed on a photosensitive drum 33, onto the transfer sheet P gripped on the transfer drum 29. After the image transfer, the transfer sheet P is guided by a conveyor belt 34 to a fixing unit 40, and, after image fixation by fixing rollers 38, 39, is discharged to a tray 35 positioned outside the apparatus. A sheet discharge sensor 36, for detecting the sheet discharge, is provided at a determined position in the discharge part of the fixing unit 40.

Figure 2:
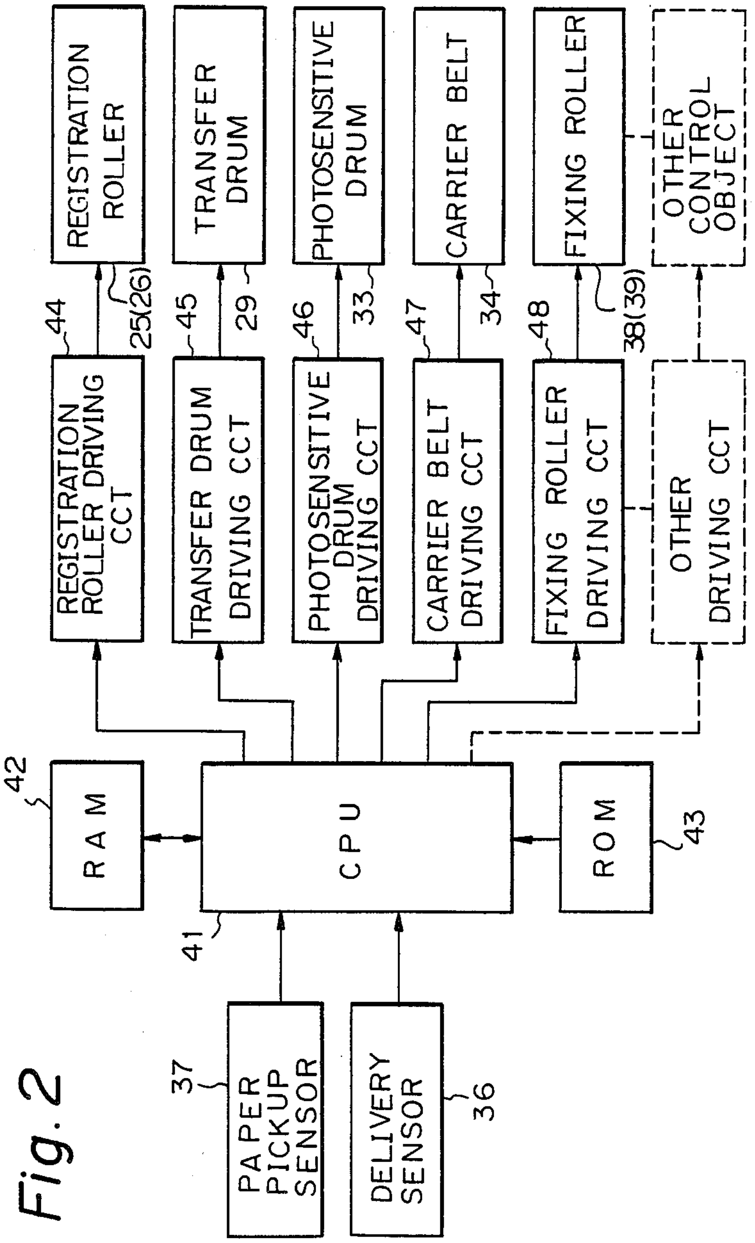
FIG. 2 is a block diagram showing an example of a control system to be employed in the apparatus of FIG. 1.

FIG. 2 schematically shows a control system employed in the apparatus shown in FIG. 1.

In FIG. 2, there are provided a central processing unit (CPU) 41 for controlling various component units in response to the signals from the sheet feed sensor 37 etc.; a random access memory (RAM) 42 for storing the status etc. of the component units; and a read-only memory (ROM) 43 for storing microinstructions for causing the CPU 41 to execute control procedures as shown in FIGS. 3 to 6 in the control of component units.

There are further provided a registration roller driving circuit 44 for driving the registration rollers 25, 26; a transfer drum driving circuit 45 for driving the transfer drum 29; a photosensitive drum driving circuit 46 for driving the photosensitive drum 33; a conveyor belt driving circuit 47 for driving the conveyor belt 34, and a fixing roller driving circuit 48 for driving the fixing rollers 38, 39.

Now there will be given an explanation on the control procedure of the present embodiment while making reference to flow charts shown in FIGS. 3 to 6.

Figure 3B:
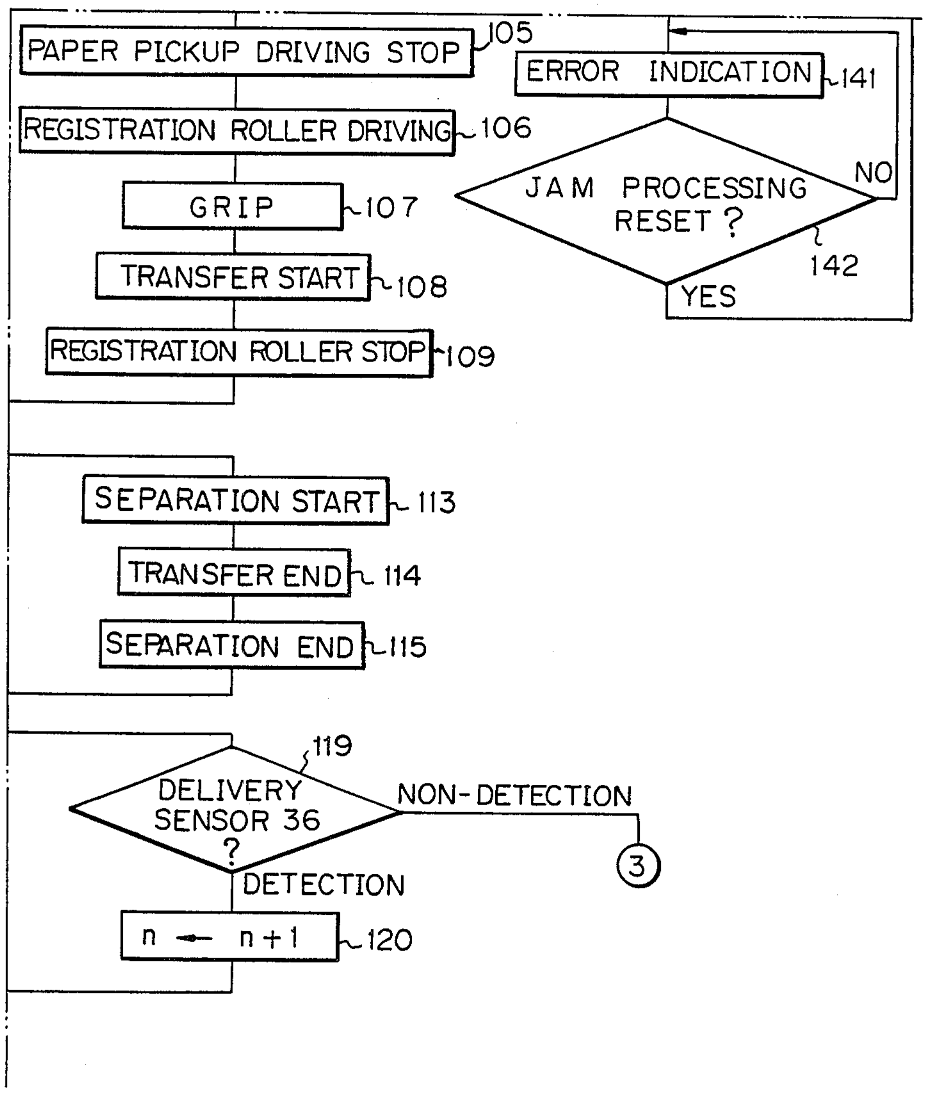
FIG. 3 consisting of FIGS. 3A–3D is a flow chart showing a main image recording sequence in a continuous operation of forming mono-color images with the image recording apparatus shown in FIG. 1.
Figure 3C:
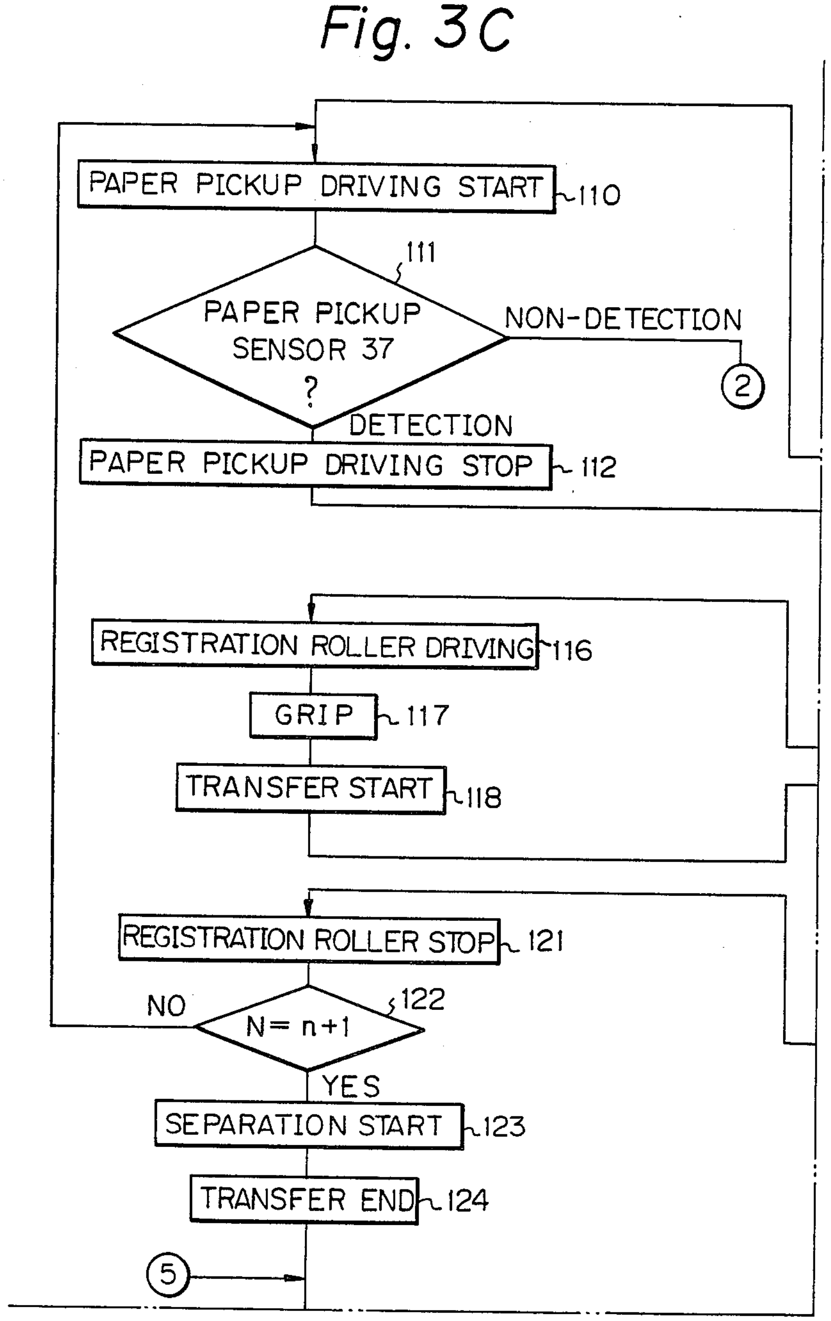
Figure 3D:
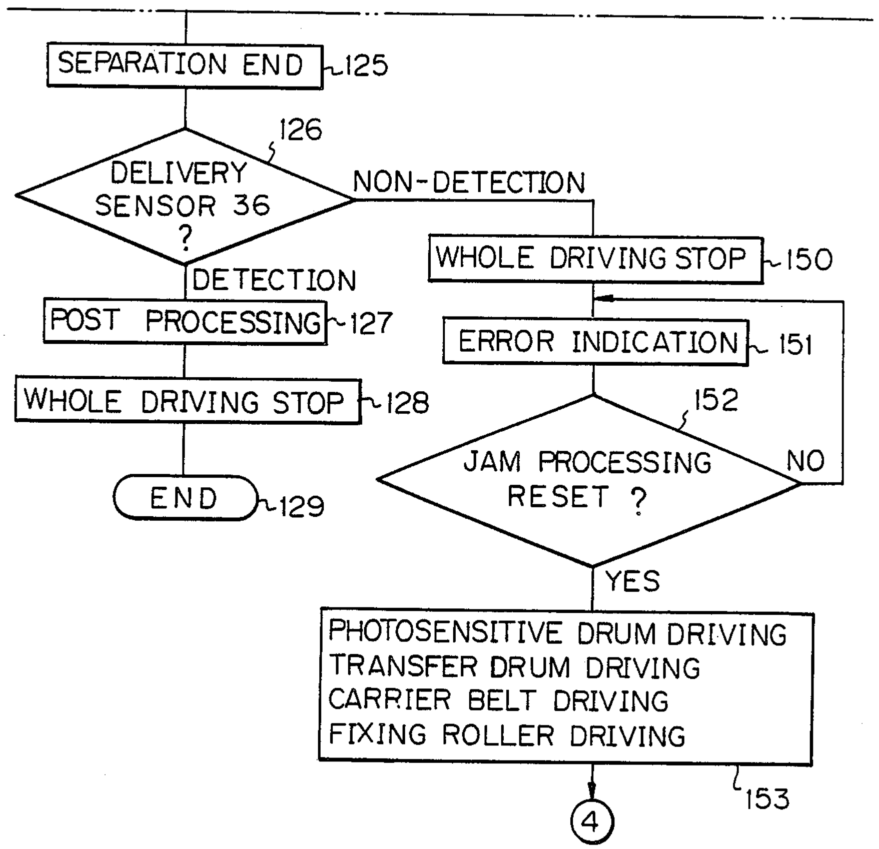
Figure 4B:
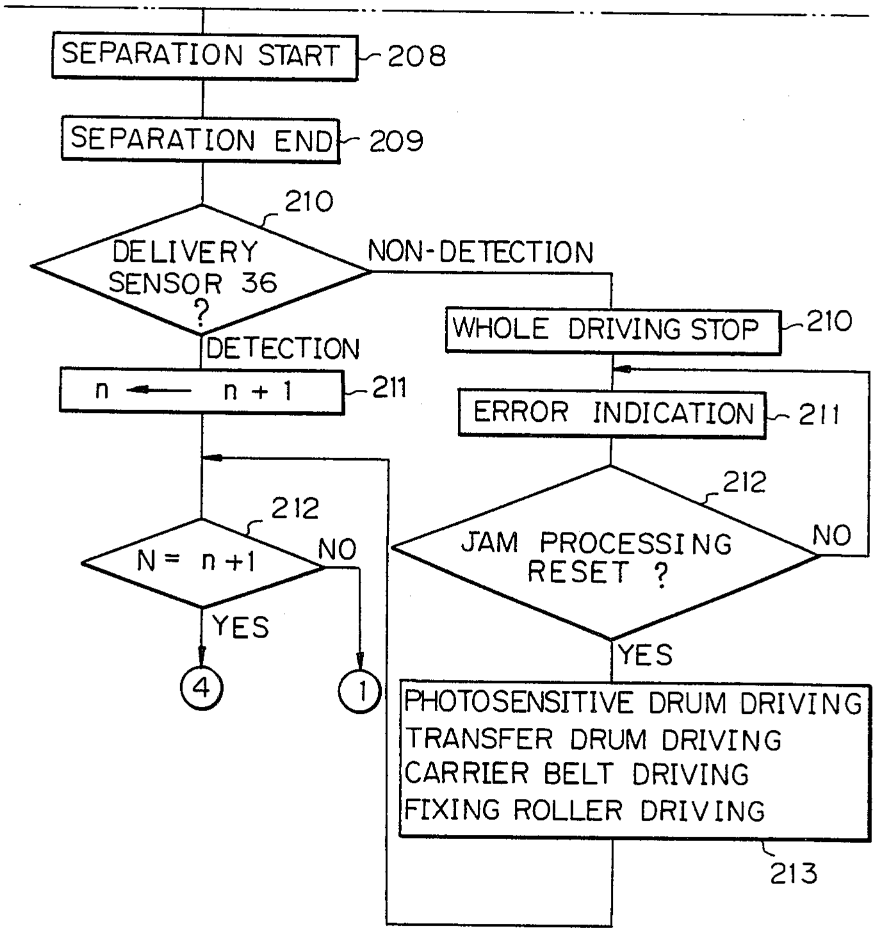
FIG. 4 consisting of FIGS. 4A and 4B is a flow chart showing an interruption sequence in case of an abnormality in transportation in a sheet feeding unit during an image transfer.
Figures 5, 5A:
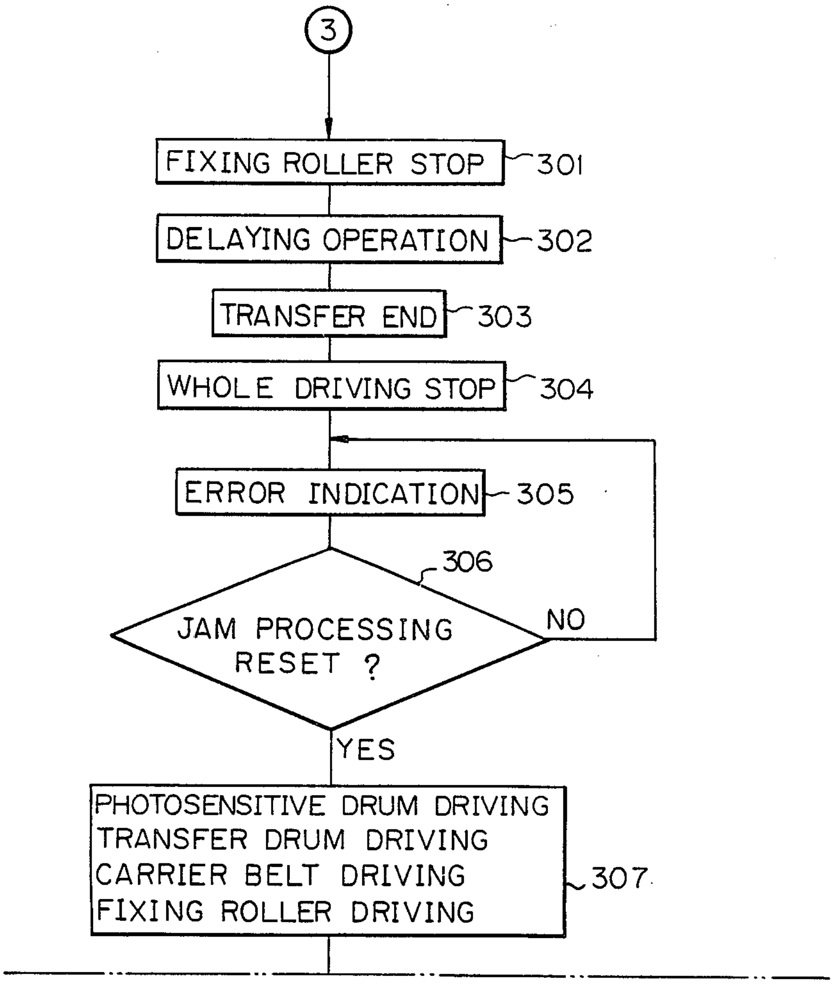
FIG. 5 consisting of FIGS. 5A and 5B is a flow chart showing an interruption sequence in case of an abnormality in transportation in an image fixing unit during an image transfer.
Figure 5B:
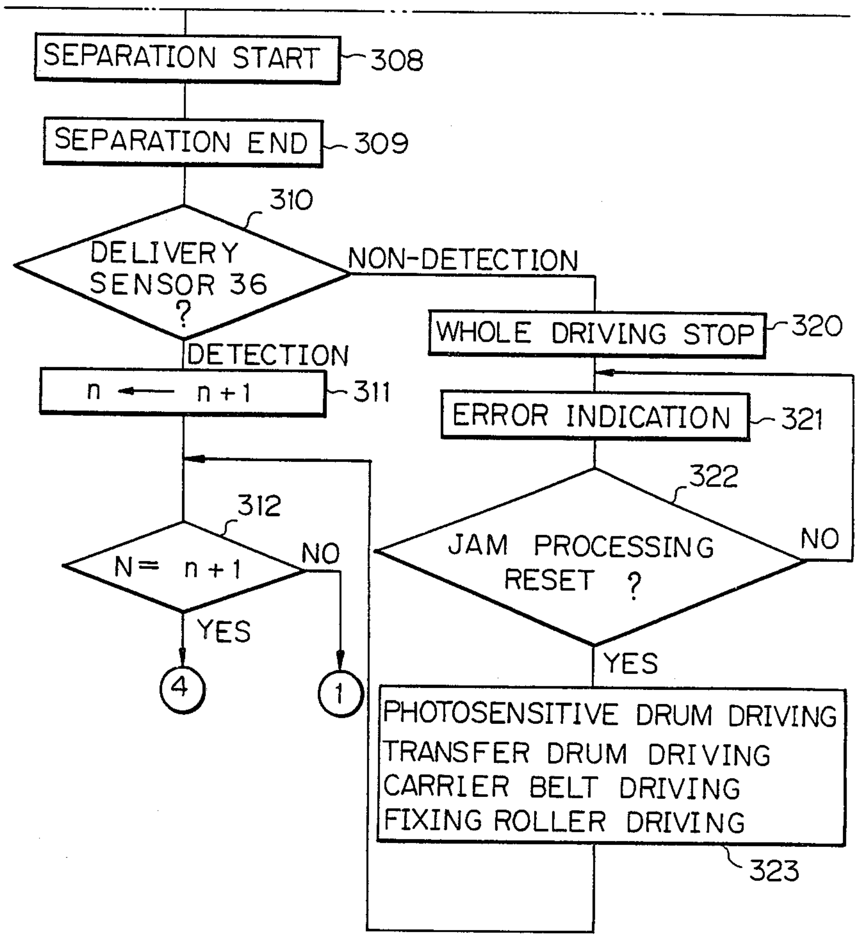
Figure 6:
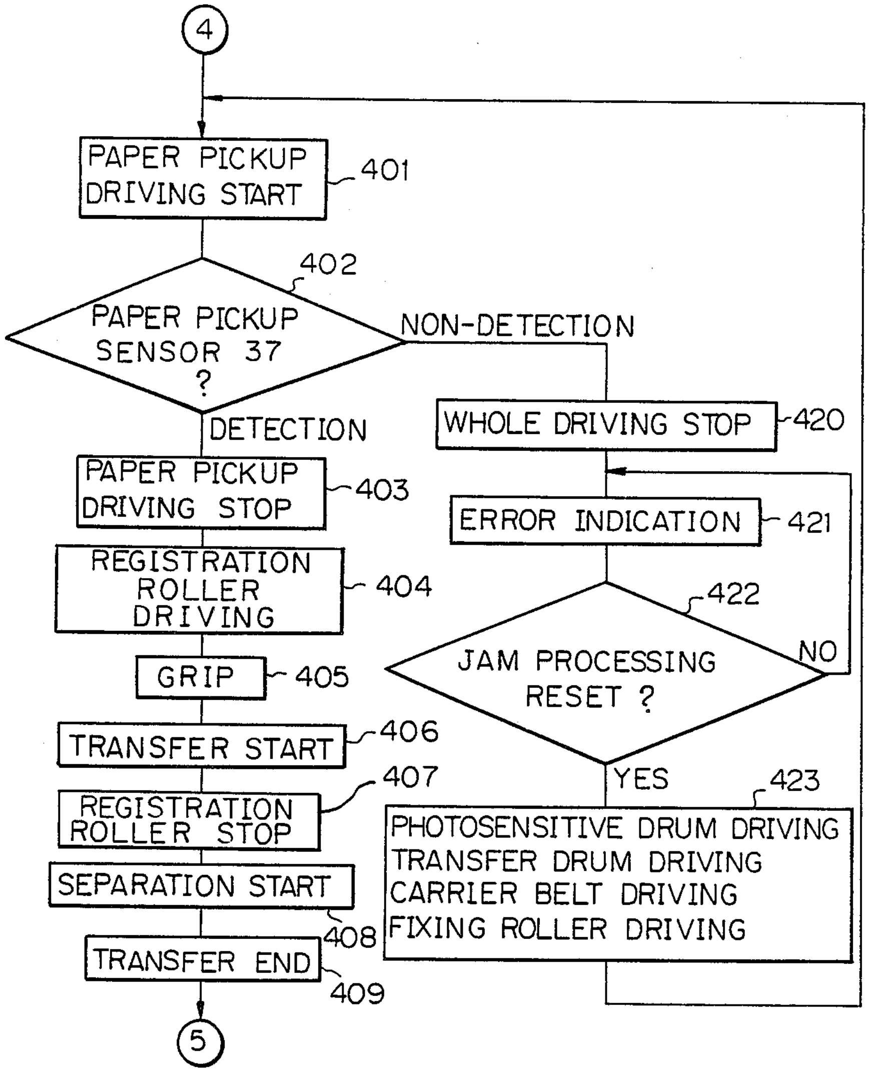
FIG. 6 is a flow chart showing an interruption sequence in case of an abnormality in transportation in the final formation of a mono-color image.

FIG. 3 is a flow chart of a main image recording sequence in a continuous operation of forming mono-color images with the image recording apparatus shown in FIG. 1;

FIG. 4 is a flow chart of an interruption sequence in case of an abnormality in the transportation in the sheet feed unit during an image transfer;

FIG. 5 is a flow chart of an interruption sequence in case of an abnormality in the transportation in the fixing unit during an image transfer; and FIG. 6 is a flow chart of an interruption sequence in case of an abnormality in the transportation during a final mono-color image formation.

Referring to FIG. 3, when an image forming operation is started in a step 100, a succeeding step 101 executes initialization for the image forming process, for example resetting a control variable n, for counting the number of image formations, to zero. A step 102 then activates the driving circuits, thus starting the photosensitive drum 33, transfer drum 29, conveyor belt 34 and fixing rollers 38, 39. Simultaneously unit operations for the electrophotographic process, such as charging, exposure, development etc. are activated around the photosensitive drum 33.

A step 103 starts the rotation of the feed roller 22 to advance an uppermost sheet P1, of the stacked transfer sheets P in the cassette 21, into the apparatus and toward the registration rollers 25, 26 through the guide members 23, 24. The sheet feed sensor 37 detects the passing of the sheet P1, and a step 104 identifies whether such detection has been made by the sensor 37.

In case the sheet feed sensor 37 does not detect the transfer sheet P1 within a determined time due to a jamming in the sheet feeding, the program proceeds to a step 140 to immediately stop all the driven parts, and a step 141 then displays an error message on an unrepresented display unit. Then, when the operator has removed the jammed sheet and reset the apparatus, the program returns from a step 142 to the step 102, and the image recording is re-started when a copy start key is actuated.

On the other hand, if the transfer sheet P1 is detected by the sheet feed sensor 37, a step 105 stops the rotation of the sheet feed roller 22. In this state the leading end of the transfer sheet P1 has already reached the nip of the registration rollers 25, 26. A subsequent step 106 starts the rotation of the registration rollers 25, 26 at a determined rotational angle of the transfer drum 29 in such a manner that the transfer sheet P1 can reach the gripper 30 rotating with the transfer drum 29.

The transfer sheet P1 is gripped, at the leading end thereof, by the gripper 30 in a step 107, and reaches an image transfer position, between the photosensitive drum 33 and the transfer charger 32, by the rotation of the transfer drum 29, while said sheet P1 being attracted to the external periphery of said drum 29 by the attraction charger 31. A succeeding step 108 activates the transfer charger 32 to initiate the image transfer. In this state the trailing end of the transfer sheet P1 has passed the registration rollers 25, 26, and a step 109 stops the registration rollers 25, 26.

Immediately thereafter, a step 110 starts the feeding of a transfer sheet P2 from the cassette 21, for use in a second image recording. A succeeding step 111 identifies, by the sheet feed sensor 37, whether the second sheet P2 has been properly fed. If the sensor 37 cannot detect the transfer sheet P2 within a determined time due to sheet jamming, the program proceeds to a flow shown in FIG. 4.

On the other hand, if the sensor 37 detects the transfer sheet P2 within said determined time, the program proceeds to a step 112 for terminating the rotation of the sheet feed roller. In this state the preceding transfer sheet P1 on the transfer drum 29 is still receiving, in the trailing part, image transfer but the leading part is already released from the gripper 30. Said sheet is separated from the transfer drum 29 in a step 113 and is transferred onto the conveyor belt 34. A succeeding step 114 completes the image transfer onto the preceding transfer sheet P1 to the trailing end thereof, and a step 115 completes the separation of said sheet P1 from the transfer drum 29. In this state, the gripper 30 rotating with the transfer drum 29 is in a rotational position capable of gripping the succeeding transfer sheet P2.

A succeeding step 116 activates the registration rollers 25, 26 at a determined timing, corresponding to such rotational angle of the transfer drum 29 that the succeeding transfer sheet P2 can reach said gripper 30. Then a step 117 completes the gripping of the transfer sheet P2, and a step 118 initiates the image transfer in the same manner as in the preceding transfer sheet P1. In this state the preceding transfer sheet P1 has been introduced into the fixing unit 40 by the conveyor belt 34.

A succeeding step 119 discriminates the jamming of said transfer sheet P1 in the fixing unit 40 according to whether the sheet discharge sensor 36 detects the preceding transfer sheet P1 within a determined time, and, in the absence of said detection, the program proceeds to a flow shown in FIG. 5. On the other hand, if the preceding transfer sheet P1 is properly detected by the sheet discharge sensor 36, the program proceeds to a step 120.

The step 120 counts the number of image recording operations by adding "1" to the aforementioned control variable n. Thereafter the preceding transfer sheet P1 is discharged onto the tray 35. In this state the trailing end of the succeeding transfer sheet P2 has passed the registration rollers 25, 26, and a step 121 thus stops the registration rollers 25, 26. A succeeding step 122 identifies whether the number of image recording operations has reached a determined number N, and, if not, the program returns to the step 110, whereby a transfer sheet P is supplied for a next image formation and the above-explained steps are repeated.

On the other hand, the program proceeds to a step 123 when the number of image recordings reaches the determined number N. In this state, the trailing part of an N-th transfer sheet $P_N$ on the transfer drum 29 is still in the course of image transfer, but the leading part of said sheet has completed image transfer and is released from the gripper 30, and the step 123 starts the separation from the transfer drum 29. Then a step completes the image transfer to the trailing end of the transfer sheet $P_N$, and a step 125 completes the separation of said sheet from the transfer drum 29.

Then the transfer sheet $P_N$ is transferred to the fixing unit 40 by the conveyor belt 34 for image fixation. Then, if a step 126 detects the transfer sheet $P_N$ within a determined time by the sheet discharge sensor 36, a step 127 executes a post-process for terminating the image recording apparatus, a step 128 stops all the driving systems and a step 129 terminates the continuous image recording operation.

On the other hand, if the discharge of the transfer sheet $P_N$ is not confirmed in the step 126, the program proceeds to a step 150 for stopping all the driving systems, and a succeeding step 151 displays an error message. When the operator removes the transfer sheet $P_N$ in the fixing unit 40 and resets the apparatus, the program proceeds from a step 152 to a step 153 to start the photosensitive drum 33, transfer drum 29, conveyor belt 34, and fixing rollers 38, 39 for final image recording.

Thereafter the program proceeds to a flow, shown in FIG. 6, for image recording on a transfer sheet P only. The processes of steps 401–407 shown in FIG. 6 are respectively same as those of steps 103–109 for image recording on plural transfer sheets shown in FIG. 3. Also steps 420–423 branched from the step 402 are same as the steps 140–142 and 120 shown in FIG. 3.

On the other hand, if the apparatus proceeds in normal manner to the step 407, a step 408 starts the separation, from the transfer drum 29, of the transfer sheet P from the leading part thereof that has completed the image transfer, and, when the image transfer is completed to the trailing end by a step 409, the program returns to the step 125 shown in FIG. 3 to repeat the final image recording.

In the following there will be explained a case in which there occurs an abnormality in transportation, such as a sheet jamming, in the sheet feeding unit or in the sheet discharge unit within a loop from the step 110 to the step 122 shown in FIG. 3, in the course of continuous image recording operation.

At first, if the sheet feed sensor 37 does not detect a transfer sheet Pi within a determined time in the step 111, the program proceeds to a step 201 shown in FIG. 4.

The step 201 immediately stops the rotation of the sheet feed roller 22 in order to avoid that the jammed transfer sheet Pi is entangled or stuck in unexpected part. Then a step 203 performs a delaying operation in order to continue and complete the image transfer of the transfer sheet Pi currently in progress, and, upon completion thereof, a step 203 terminates the power supply to the transfer charger thereby terminating the image transfer. Thereafter a step 204 stops the photosensitive drum 33, transfer drum 29 etc. and a step 205 displays an error message indicating that a jamming is present in the sheet feed unit containing the sheet cassette 21 etc.

When the operator removes the jammed sheet and resets the apparatus in response to said error message, the program proceeds from a step 206 to a step 207 for re-starting the photosensitive drum 33, transfer drum 29, conveyor belt 34, and fixing rollers 38, 39 in order to advance the transfer sheet Pi which has completed the image transfer stage. Then steps 208 and 209 separate the transfer sheet Pi from the transfer drum 29 and sends said sheet to the fixing unit 40 by the conveyor belt 34. Then, if the sheet discharge sensor 36 detects said transfer sheet Pi in a step 210, a step 211 adds "1" to the aforementioned control variable n.

On the other hand, if the sheet Pi is not detected by the sensor 36 in the step 210, the program proceeds to succeeding steps 210–213, which are same as those 150–153 shown in FIG. 3, and thereafter the program proceeds to a step 212. Consequently the addition of "1" to the control variable is not conducted in this case. Then, if two or more image recordings still remain in the step 212, the program returns to the step 103 shown in FIG. 3 to repeat the image forming procedure explained before. On the other hand, if only one image recording remains, the program proceeds to the flow shown in FIG. 6, then from the step 409 to the step 125 shown in FIG. 3, and returns to the original flow.

Thus, in case an abnormality in the transportation occurs in the sheet feed unit in the course of image transfer onto a transfer sheet Pi on the transfer drum 29, said image transfer is continued until completion, and all the driving systems are thereafter stopped to request the operator to deal with the transfer sheet that has caused said abnormality. When the operator removes said sheet and resets the apparatus, the transfer sheet Pi is separated from the transfer drum 29, subjected to image fixing and discharged to the tray 35. Then the apparatus returns to a procedure for executing the remaining image recordings.

In case, in the step 119, the sheet discharge sensor 36 does not detect the transfer sheet Pi within the determined time, the program proceeds to a step 301 shown in FIG. 5.

The step 301 stops the fixing rollers 38, 39 in order to avoid undesirable effect of the jammed transfer sheet Pi to said rollers. Then a step 302 effects a delay operation in order to continue and complete the image transfer onto the transfer sheet currently in progress. Upon completion of said image transfer, a succeeding step 303 terminates the power supply to the transfer charger, thus terminating the image transfer operation.

Then a step 304 stops all the driving systems including the photosensitive drum 33, transfer drum 29 etc. and a step 305 displays an error message, indicating a jamming in the sheet discharge unit. When the operator removes the jammed sheet and resets apparatus, the program proceeds from a step 306 to a step 307 to activate the photosensitive drum 33, transfer drum 29, conveyor belt 34 and fixing rollers 38, 39 to advance the transfer sheet Pi that has completed the image transfer. Then steps 308 and 309 separate the transfer sheet Pi from the transfer drum 29, and send said sheet to the fixing unit 40 by the conveyor belt 34.

Then, if the sheet discharge sensor 36 detects the transfer sheet Pi in a step 310, a step 311 adds "1" to the control variable n. On the other hand, if said sensor 36 does not detect the transfer sheet Pi in the step 310, the program proceeds to steps 320–323 which are same as those 150–153 shown in FIG. 3, and then to a step 312. Consequently, the addition of "1" to the control variable does not take place in this case.

If two or more image recordings still remain in the step 312, the program returns to the step 103 shown in FIG. 3 to repeat the above-explained image forming procedure. On the other hand, if only one image recording remains, the program proceeds to the flow shown in FIG. 6, then from the step 409 to the step 125 shown in FIG. 3 and returns to the original flow.

Consequently, in case there occurs an abnormality in the transportation of a preceding transfer sheet $P_{i-1}$ in the fixing unit 40 during the image transfer onto a succeeding transfer sheet $P_i$ on the transfer drum 29, said image transfer is continued until the completion thereof, and all the driving systems are stopped to request the operator to deal with thus troubled sheet. When the operator removes said transfer sheet $P_{i-1}$ and resets the apparatus, the transfer sheet $P_i$ is separated from the transfer drum 29, then subjected to image fixation and discharged to the tray 35. Then the apparatus returns to a procedure for effecting the remaining image recordings.

The foregoing explanation has been limited to a continuous operation of forming mono-color images with an electrophotographic color image recording apparatus. In the formation of a color image, however, there are required plural transfers of toner images of different colors for obtaining an image. Consequently, in case of a trouble in transportation in the sheet feed unit or sheet discharge unit in the course of image transfer, the above-explained control can be applied also to color image formation by continuing the image transfer operation, until the remaining images are all transferred.

It is also possible to complete an image transfer which is in progress at the trouble in transportation and to effect the transfers of images of other colors after the sheet jamming is resolved. In such case steps for plural image transfers can be added between the steps 207 and 208 in FIG. 4 or between the steps 307 and 308 in FIG. 5. In this manner it is rendered possible to reduce the time from the start of abnormality to the stoppage of the driving systems by a time required for plural transfers, while attaining the object of the present invention, thus minimizing the continuation of operation while the trouble remains unattended.

In the foregoing embodiment, the image transfer is continued and the driving systems are stopped after the completion of said image transfer for any abnormality in the transportation in the sheet feed unit upstream of or in the fixing unit downstream of the transfer drum, but it is also possible to continue the operation until the transfer sheet currently in image transfer is discharged after image fixation only for an abnormality in the upstream side.

The display of error message, which is given after the driving systems are stopped in the foregoing embodiment, may also be given immediately after the branching step for discriminating error.

Though the foregoing explanation has been limited to an embodiment utilizing an electrophotographic image recording apparatus having a transfer drum, the present invention is not limited to such embodiment but is applicable also to other image recording apparatus in which sheet materials are supported on a rotary support member, such as a thermal transfer image recording apparatus in which a transfer sheet supported on a rotary cylindrical platen is contacted with an ink sheet and the ink on said ink sheet is melted by a thermal head applied from the back of said ink sheet and transferred onto said transfer sheet to form an image, an ink jet image recording apparatus having a similar platen, or an image recording apparatus in which a photosensitive master sheet or an ink sheet supported on a rotary member is contacted with a recording sheet to transfer an image thereto. In such apparatus the objects of the present invention can be achieved by continuing the image recording operation until the completion of a serial procedure in case of an abnormality in the transportation of a sheet material other than that on the rotary support member currently subjected to image recording operation.

As explained in the foregoing, it is rendered possible to effectively utilize sheet materials without waste, in case of an abnormality in the transportation of sheet materials other than that placed on the rotary support member, by continuing the image forming process for said sheet material on the rotary support member until the completion of said process, and advancing said sheet material to the ordinary transport path after the sheet material that has caused said abnormality is removed by the operator.

Also there are provided following advantages:

(1) Operation of sheet removal is easier because it is not necessary to remove the sheet on the rotary support member but the sheets that have caused trouble in transportation only:

(2) The sheet material in the course of image formation can be effectively used without waste since the sheet on the rotary support member need not be removed in such trouble in transportation:

(3) It is rendered possible to prevent waste of other image forming materials such as toner or ink since the sheet material in the course of image formation can be effectively utilized without waste:

(4) In case of a trouble in transportation, unevenness in the obtained image can be prevented as in the case of immediately interrupting the image forming operation, as the image forming operation is continued until a serial procedure is completed: and (5) It is rendered possible to avoid contamination in the apparatus, caused by the removal of the transfer sheet bearing unfixed toner image which easily causes scattering of toner, as such transfer sheet no longer needs to be removed.

It is also possible, in case of an abnormality in transportation of sheet materials other than that on the transfer drum, to continue the image transfer at the transfer drum until the completion thereof and to guide the sheet material from said transfer drum to fixing means when it reaches a determined fixing temperature after the sheet materials having caused said abnormality are removed, thereby enabling efficient discharge of the sheet material on the transfer drum without incomplete image fixation.

Figure 7:
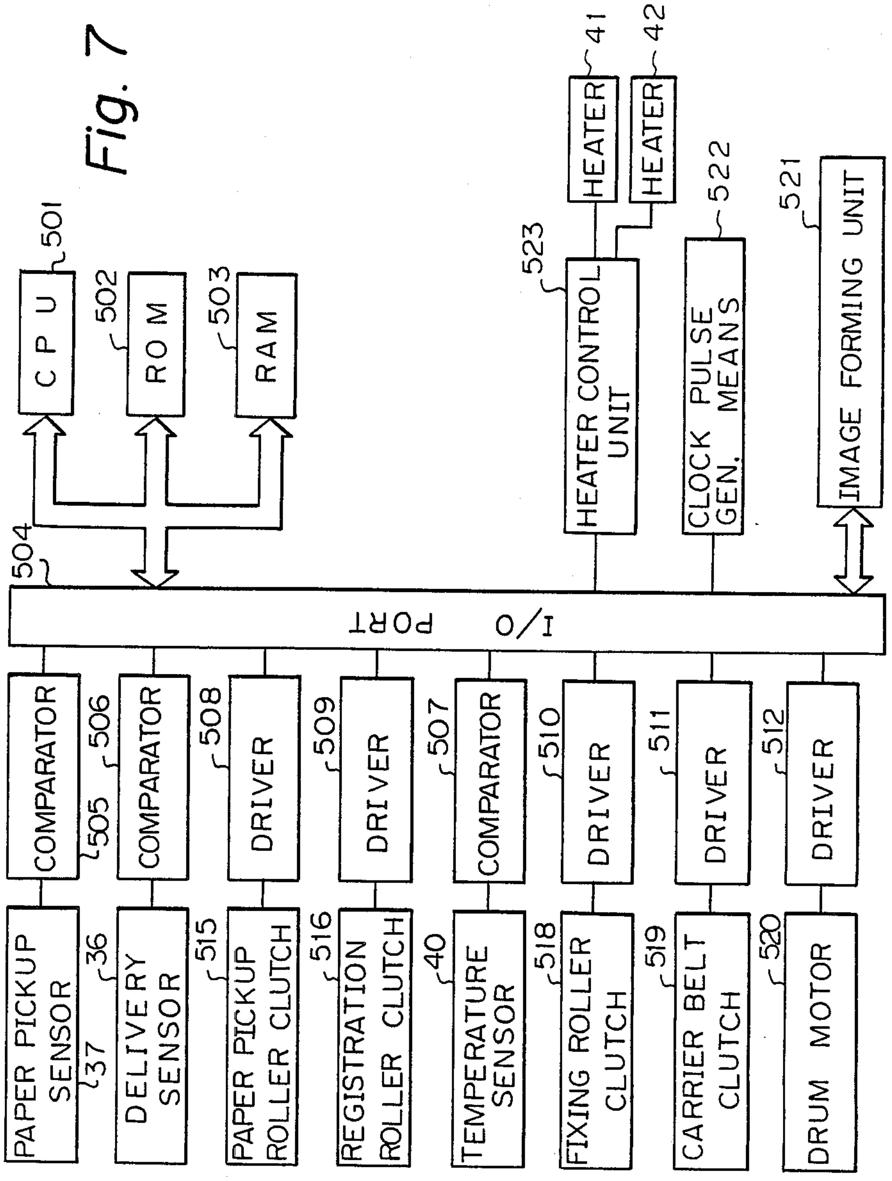
FIG. 7 is a block diagram showing a control circuit of another embodiment of the present invention.

FIG. 7 is a block diagram showing a control circuit for realizing such control.

In FIG. 7 there are provided a central processing unit (CPU) 501 for controlling various component units in response to signals from sheet feed sensor 37 etc.; a random access memory (RAM) 503 for storing status of various component units; and a read only memory (ROM) 502 for storing microinstructions of control procedures as shown in FIGS. 3 to 5 to be executed by the CPU 501 for controlling the component units.

Comparators 505–507 are provided for binary digitizing output detection signals from a sheet feed sensor 37, a sheet discharge sensor 36 and a temperature sensor 40.

Driver circuits 508–512 are provided for respectively controlling a sheet feed roller clutch 515; a registration roller clutch 516; a fixing roller clutch 518; a conveyor belt clutch 519; and a drum motor 520.

There are further provided an image forming unit 521 for image formation; clock pulse generating means 522 for generating signals synchronized with the rotation of a photosensitive drum 33; and a heater control unit 523 for controlling power supply, and temperature of fixing heaters 41, 42.

The power supply to the fixing heaters 41, 42 are so controlled as to maintain respectively corresponding fixing rollers 38, 39 at a constant temperature, and is totally interrupted in case of an abnormality in transportation in the fixing unit 43.

The above-explained components are electrically connected through an I/O port, and the control sequence of the present embodiment proceeds, as will be explained later, by the control of various driver circuits in reference to the signals from the clock pulse generating means 522.

Figure 8:
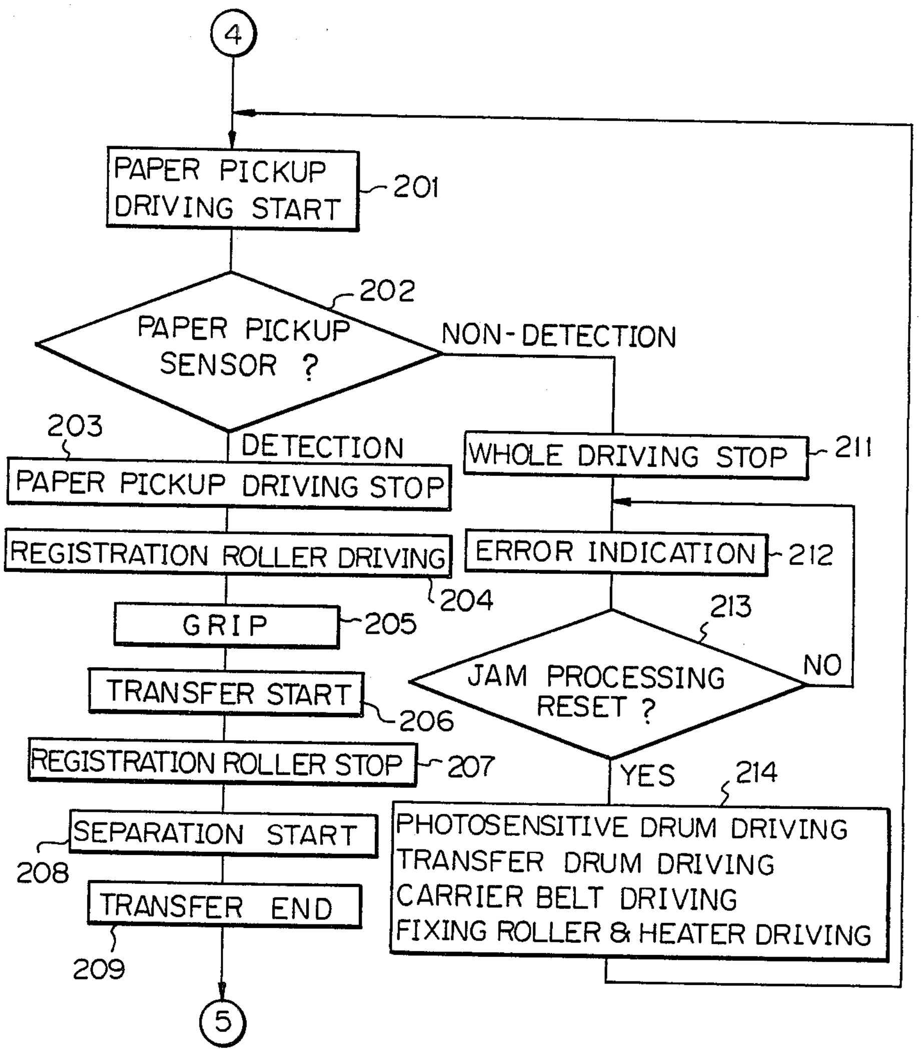
FIGS. 8 and 9 consisting of FIGS. 9A–9C are flow charts showing control sequences of another embodiment of the present invention.
Figure 9A:
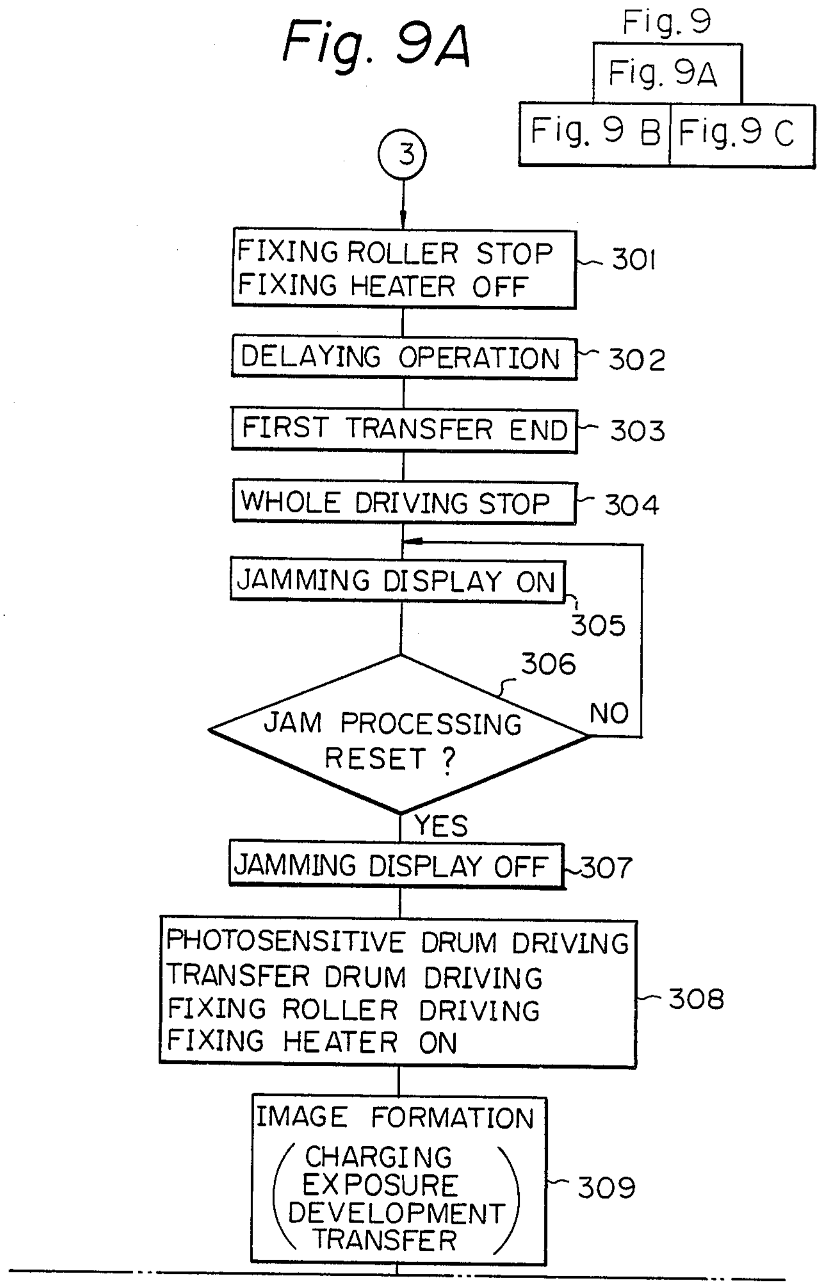
Figure 9B:
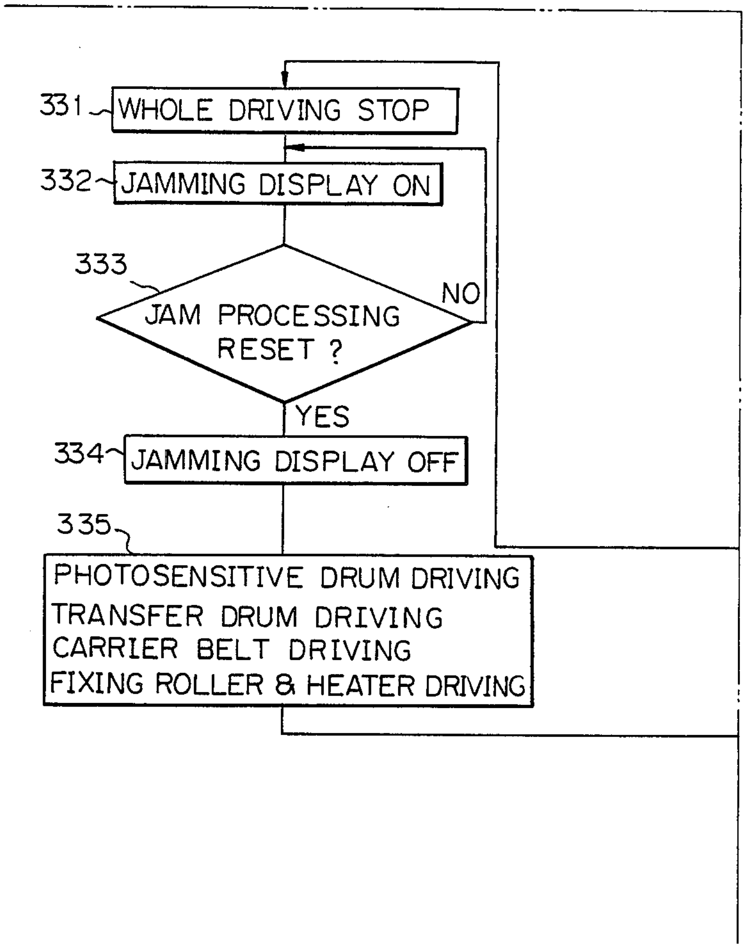
Figure 9C:
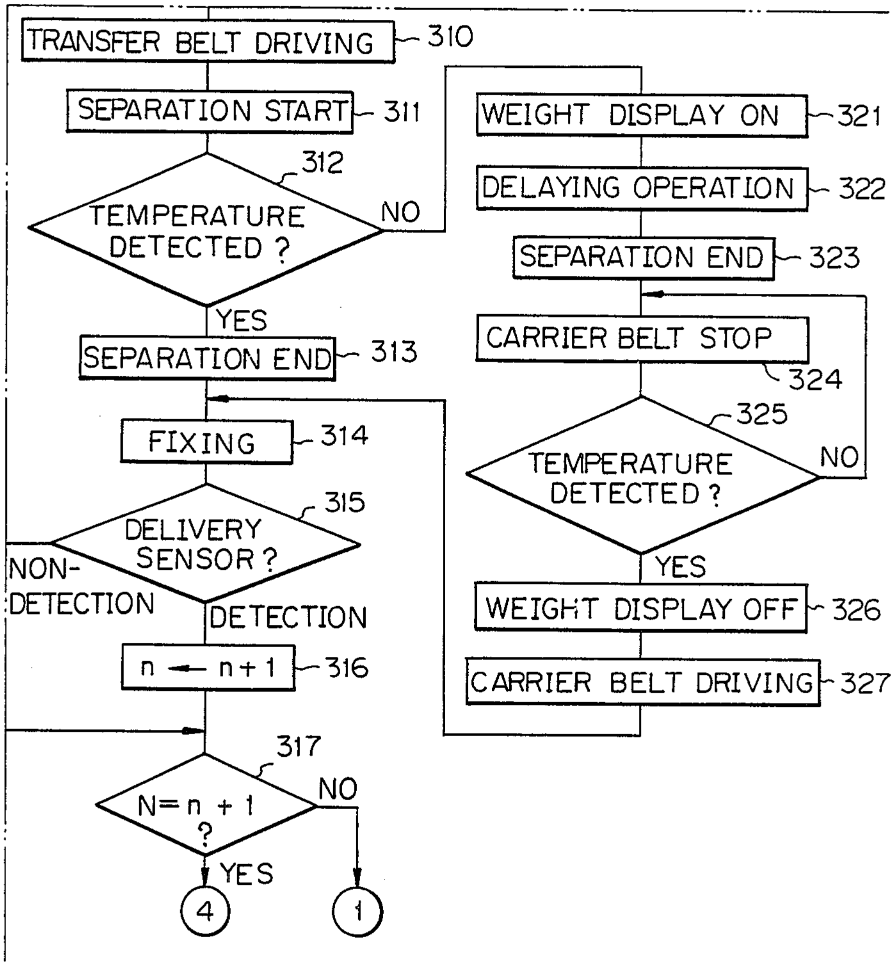

Now reference is made to the flow charts shown in FIGS. 8 and 9, for explaining the control procedure of the present embodiment.

A main flow, indicating the image recording sequence of an electrophotographic color image recording apparatus in a continuous image forming operation, will be omitted as it is similar to that shown in FIG. 3.

FIG. 8 shows a flow chart of an interruption sequence in case of an abnormality in transportation in the final image forming cycle in a continuous image forming operation, and FIG. 9 shows a flow chart of an interruption sequence in case of an abnormality in the fixing unit during an image transfer operation.

When the operator removes a transfer sheet $P_N$ in the fixing unit 43 and resets the apparatus in a step 152 shown in FIG. 3, the program proceeds to a step 153 for re-activating the photosensitive drum 33, transfer drum 29, conveyor belt 34 and fixing rollers 38, 39 for the final image forming cycle.

Then the program enters an image forming flow, shown in FIG. 8, for a transfer sheet P. In FIG. 8, steps 201–207 are same as the steps 103–109, shown in FIG. 3, for image recording on plural transfer sheets P. Also steps 211–214, branching from a step 202, are same as the steps 140–142 and 102 shown in FIG. 3.

On the other hand, in case the apparatus operates in normal manner up to the step 207, a step 208 initiates separation of the transfer sheet P from the transfer drum 209, starting from the leading end portion of said sheet that has completed image transfer, and, when the image transfer is completed to the trailing end of the sheet in a step 209, the program returns to a step 125 shown in FIG. 3 for inspecting normal transport of the final sheet in the step 126 etc.

On the other hand, if the step 119 does not detect a transfer sheet Pi−1 within a determined time by the sheet discharge sensor 36, the program proceeds to a flow chart shown in FIG. 9.

At first a step 301 stops the fixing rollers 38, 39 and interrupts power supply to the fixing heaters 40, 41. Then a step 302 effects a delaying operaion in order to continue the image transfer operation currently in progress on the transfer drum 29, and a step 303 completes the image transfer, for example of a first color, in images to be superposed on the transfer sheet.

Then a step 304 stops all the driving systems, and a succeeding step 305 displays a jam message for the operator. A step 306 awaits a jam recovery in the fixing unit 43 and a resetting of the apparatus. Upon completion of said jam recovery and resetting, a step 307 terminates the jam message display, and a step 308 reactivates the photosensitive drum 33, transfer drum 29, fixing rollers 38, 39 and fixing heaters 40, 41 for a succeeding image forming cycle.

A step 309 effect formation and transfer of the remaining images of the images to be superposed on the transfer sheet Pi on the transfer drum 29, and, upon completion of multiple transfers on all the color images on said transfer sheet Pi, a step 310 starts the conveyor belt 34, and a step 311 initiates separation of the transfer sheet Pi from the transfer drum 29.

Subsequently a step 312 detects the temperature of the fixing unit 43 with the temerature sensor 42 and identifies whether thus detected temperature is within a suitable fixing temperature range, and the program proceeds either to a step 321 if the fixing unit 43 has not reached such temperature range or to a step 313 if the detected temperature is already within said range.

A step 313 completes the separation of the transfer sheet Pi from the transfer drum 29 to the rear end of said sheet, and a succeeding step 314 introduces said transfer sheet Pi into the fixing unit 43 for image fixation. Then a step 315 identifies whether the transfer sheet Pi has passed the fixing unit 43 without sheet jamming, according to the output signal of the sheet discharge sensor 36. Upon identification of proper image fixation and detection of the sheet Pi by the discharge sensor 36, a step 316 renews the cumultive number of image formations.

If a step 317 identifies that two or more image formations are still remaining, the program returns to the step 103, shown in FIG. 3, to repeat the above-explained image forming procedure. On the other hand, if only one image formation remains, the program proceeds to the flow shown in FIG. 4, then from the step 209 to the step 125 and returns to the original flow.

On the other hand, if the step 312 identifies that the fixing unit 43 has not reached the predetermined temperature range, the program proceeds to a step 321 for causing a display of that effect.

Then a step 322 effects a delaying operation to continue the separation of the transfer sheet Pi, to the rear end thereof, from the transfer drum 29, and, upon completion of said separation and complete transfer of said sheet onto the conveyor belt 34 in a step 323, a step 324 stops the movement thereof.

In case a step 325 identifies that the fixing unit 43 has not reached the predetermined temperature range, the program returns to the step 324 to maintain a state in which the transfer sheet Pi is placed on the conveyor belt 34, until the fixing unit 43 reaches said temperature range, and, when the fixing unit 43 reaches said range by continued heating, the program proceeds to a succeeding step 326.

After the step 326 terminates the aforementioned display, a step 327 activates the conveyor belt 34 to transport the transfer sheet Pi to the fixing unit 43, and a succeeding step 314 fixes the transferred image to the sheet Pi. Then, if a step 315 detects the transfer sheet Pi by the discharge sensor 36, a step 316 steps up the number of image recordings.

On the other hand, in case the step 315 does not detect the transfer sheet Pi, the program proceeds to steps 331–325, similar to the steps 150–153 shown in FIG. 3, and then to the step 317. Consequently, in this case, the operation of increment of the number of image formations in the step 316 is not executed.

In case the step 317 identifies that two or more image forming cycles are still remaining, the program returns to the step 103, shown in FIG. 3, for repeating the above-explained image forming procedure. On the other hand, if only one image formation remains, the program proceeds to the flow shown in FIG. 4, then from the step 209 to the step 125 shown in FIG. 3 and returns to the original flow.

In the above-explained control procedure, in case of an abnormality in the transportation, for example of the transfer sheet Pi−1 in the fixing unit 43 during the transfer of image of a first color onto the transfer sheet Pi on the transfer drum 29, the power supply to all the driving systems and to the heaters of the fixing unit 43 is interrupted after the completion of said image transfer of first color. Then, when the operator removes said transfer sheet Pi−1 and resets the apparatus during said interruption, the apparatus effects transfer of remaining colors onto the transfer sheet Pi and transports said sheet by the conveyor belt 34 to the fixing unit 43. Besides the apparatus detects the temperature of the fixing unit 43 in the course of this operation, and allows the entry of said sheet into the fixing unit 43 if it has reached an appropriate temperature but maintains said sheet on the conveyor belt 34, if the fixing unit has not reached said appropriate temperature, until such temperature is reached.

On the other hand, in case of a jamming of another sheet Pi+1 in the upstream sheet feed path to the transfer drum 29 during an image transfer operation onto the transfer sheet Pi on said transfer drum 29, the program proceeds, from the step 111 shown in FIG. 3, to a step 111A, which will not be explained further as it is essentially same as the process shown in FIG. 9. More specifically the control procedure thereafter is same as that shown in FIG. 9, except that the process in the step 301 thereof for stopping the sheet feeding operation is conducted simultaneously with the interruption of power supply to the fixing rollers and the stopping of the fixing rollers.

In the present embodiment the transfer sheet Pi is made to wait on the conveyor belt 34, but it is also possible to retain the transfer sheet on the transfer drum.

Also the present invention is not limited to the electrophotographic color image recording apparatus as described in the foregoing embodiment but is applicable also to an electrophotographic image recording apparatus for forming images on both sides of a sheet material by means of a sheet inverting mechanism and a transfer drum.

As explained in the foregoing, the embodiment does not immediately stop the image transfer operation on the transfer drum, in case of an abnormality in the transportation of sheets other than that on said transfer drum, but continues said image transfer operation until the completion thereof, and, after the sheet materials that have caused said abnormality are removed, guides the sheet material on the transfer drum to fixing means for image fixation when said fixing means reaches a determined fixing temperature, thereby discharging the sheet material efficientrly in time, without unsatisfactory image fixation.

In addition the foregoing embodiment has following advantages:

(1) In case a sheet is jammed during an image transfer operation of another sheet, and if the temperature of the fixing unit becomes lower during the removal of the former sheet due to an interruption in the power supply to the fixing heaters, the sheet that has completed image transfer can be maintained free from in-complete image fixation or low-temperature offsetting since it is introduced into the fixing unit for image fixation after said unit reaches an appropriate fixing temperature:

(2) In case of multiple superposed transfers, the fixing heaters are at first activated for temperature control after the jammed sheet is removed, and the temperature of said fixing unit is detected to identify whether the sheet should be introduced into the fixing unit, after the remaining image transfer are completed. Thus the heating time of the fixing unit can be reduced by the period required for said remaining image transfers. Stated differently, the waiting time for heating is shorter in comparison with a case in which the image transfers are conducted after the fixing unit is heated:

(3) If the temperature of the fixing unit is in-sufficient after the removal of the jammed sheet, the sheet has completed image transfers is made to wait immediately in front of the fixing unit, for example on a conveyor belt. In this manner it is rendered possible to minimize the time required from the arrival of the fixing unit at an appropriate temperature to the discharge of the sheet after image fixation. On the other hand, if the sheet is made to wait on the transfer drum, the sheet discharge requires a longer time since the sheet has to be separated from the drum and then transported for fixation after the fixing unit reaches an appropriate temperature. The foregoing embodiment allows to minimize the time required for such sheet transportation.

What is claimed is:

1. An image recording apparatus comprising:
support means for supporting a sheet material;
recording means for recording an image on a sheet material supported on said support means;
transport means for transporting a sheet material to said support means and transporting a sheet material after image recording from said support means;
detection means for detecting an abnormality in the transportation of a sheet material transported by said transport means at a position downstream of said support means; and
control means adapted, in case an abnormality in the transportation of a first sheet material is detected by said detection means in the course of a recording operation by said recording means for a second sheet material, to control said transport means so as to stop the transport operation for the first sheet material and to so control said recording means as to continue the recording operation for the second sheet material.

2. An image recording apparatus according to claim 1, wherein said control means is adapted, in said case of detection of an abnormality in the transportation in the course of a recording operation, to control said recording means so as to complete said recording operation for the second sheet material.

3. An image recording apparatus according to claim 1, wherein said control means is adapted to control said transport means so as to transport the second sheet material on said support means at a time of resumption of said transport operation after said abnormality in transportation.

4. An image recording apparatus according to claim 1, wherein said recording means is capable of image recording with plural colors on a sheet material supported by said support means.

5. An image recording apparatus according to claim 1 or 4, wherein said recording means comprises latent image forming means for forming an electrostatic latent image on a recording member, developing means for developing said electrostatic latent image, transfer means for transferring thus developed image onto a sheet material supported by said support means, and fixing means for fixing the image transferred onto said sheet material.

6. An image recording apparatus comprising:
latent image forming for forming an electrostatic latent image on a recording member;
developing means for developing the electrostatic latent image formed on said recording member;
transfer means for transferring the image developed by said developing means, onto a sheet material;
transport means for transporting a sheet material to said transfer means and transporting a sheet material after image transfer from said transfer means;
detection means for detecting an abnormality in the transportation of sheet materials to be transported by said transport means at a position downstream of said transfer means; and
control means adapted, in case an abnormality in the transportation of a first sheet material is detected by said detection means in the course of an image transfer operation by said transfer means for a second sheet material, to control said transport means so as to stop the transport operation for the first sheet material and to control said transfer means so as to continue the image transfer operation for the second sheet material.

7. An image recording apparatus according to claim 6, wherein said transfer means comprises means for supporting a sheet material transported by said transport means, and is adapted to transfer the developed image, formed on said recording member, onto the sheet material while it is supported by said support means.

8. An image recording apparatus according to claim 6, wherein said transport means comprises fixing means for fixing the image transferred onto said sheet material.

9. An image recording apparatus according to claim 6 or 7, wherein said control means is adapted, in said case of detection of abnormality in the transportation in the course of an image transfer operation, to control said transfer means so as to continue said image transfer operation until the completion thereof.

10. An image recording apparatus according to claim 6, 7 or 9, wherein said control means is adapted to control said transport means so as to transport the sheet material on said support means upon resumption of transport operation after said abnormality in transportation.

11. An image forming apparatus comprising:
support means for supporting a sheet material;
recording means for recording an image on a sheet material supported by said support means;
transport means for transporting a sheet material to said support means and transporting a sheet material therefrom after image recording;

fixing means for fixing the image formed on the sheet transported by said transport means;

first control means for continuing, in case of an abnormality in the transportation of a first sheet material transported by said transport means at a position downstream of said support means, an image forming operation in progress for a second sheet material on said support means until said image forming operation is completed; and second control means for causing said second sheet material to wait in a pre-determined area until said fixing means reaches a pre-determined fixing temperature, at a time of resumption of said transport operation after said abnormality.

* * * * *

UNITED STATES PATENT AND TRADEMARK OFFICE
CERTIFICATE OF CORRECTION

PATENT NO. : 4,733,281 Sheet 1 of 2

DATED : March 22, 1988

INVENTOR(S) : KENJI YOSHINAGA, ET AL.

It is certified that error appears in the above-identified patent and that said Letters Patent is hereby corrected as shown below:

Column 6, line 11, "step" should read --step 124--.

Column 11, line 12, "effect" should read --effects--;

line 35, "cumultive" should read --cumulative--.

Column 12, line 3, "331-325," should read --331-335,--;

line 67, "efficientrly" should read --efficiently--.

Column 13, line 8, "in-complete" should read --incomplete--;

line 17, "transfer" should read --transfers--;

line 23, "in-sufficient" should read --insufficient--;

line 24, "has" should read --having--.

UNITED STATES PATENT AND TRADEMARK OFFICE
CERTIFICATE OF CORRECTION

PATENT NO. : 4,733,281 Sheet 2 of 2
DATED : March 22, 1988
INVENTOR(S) : KENJI YOSHINAGA, ET AL.

It is certified that error appears in the above-identified patent and that said Letters Patent is hereby corrected as shown below:

Column 14, line 17, "forming for" should read --forming means for--.

Signed and Sealed this

Sixteenth Day of January, 1990

*Attest:*

JEFFREY M. SAMUELS

*Attesting Officer* *Acting Commissioner of Patents and Trademarks*